(12) United States Patent
Garcia-Doty

(10) Patent No.: US 12,507,734 B2
(45) Date of Patent: Dec. 30, 2025

(54) HIGH-POWER DRIVE CIRCUIT FOR A VAPORIZER HEATER

(71) Applicant: JUUL Labs, Inc., San Francisco, CA (US)

(72) Inventor: Ian Garcia-Doty, Oakland, CA (US)

(73) Assignee: JUUL Labs, Inc., Washington, DC (US)

( * ) Notice: Subject to any disclaimer, the term of this patent is extended or adjusted under 35 U.S.C. 154(b) by 501 days.

(21) Appl. No.: 17/831,303

(22) Filed: Jun. 2, 2022

(65) Prior Publication Data

US 2022/0287368 A1 Sep. 15, 2022

Related U.S. Application Data

(63) Continuation of application No. PCT/US2020/063147, filed on Dec. 3, 2020.
(Continued)

(51) Int. Cl.
*A24F 40/50* (2020.01)
*A24B 15/167* (2020.01)
(Continued)

(52) U.S. Cl.
CPC ............ *A24F 40/46* (2020.01); *A24B 15/167* (2016.11); *A24F 40/50* (2020.01); *H02M 3/1588* (2013.01); *H02J 7/0063* (2013.01)

(58) Field of Classification Search
None
See application file for complete search history.

(56) References Cited

U.S. PATENT DOCUMENTS 3,271,719 A 9/1966 Ovshinsky
4,947,874 A 8/1990 Brooks et al.
(Continued)

FOREIGN PATENT DOCUMENTS

CN 1548934 A 11/2004
CN 101261163 A 9/2008
(Continued)

OTHER PUBLICATIONS

Linear Technology Data Sheet and Product Info for LTC3786 Low IQ Synchronous Boost Controller, Revision A, date Sep. 2011, 34 pgs. (date on p. 33)—available at https://cdn.ozdisan.com/ETicaret_Dosya/482058_5551574.pdf (Year: 2024).*
(Continued)

*Primary Examiner* — Katherine A Will
(74) *Attorney, Agent, or Firm* — Mintz Levin Cohn Ferris Glovsky and Popeo, P.C.

(57) ABSTRACT

The vaporizer system includes a vaporizer body. The vaporizer body includes a power source configured to supply power to a heating element of a cartridge when the cartridge is coupled to the vaporizer device body. The vaporizer body further includes a controller configured to activate a signal configured to control supplied power to the heating element. The vaporizer body further includes a power management circuit coupled to the power source. The vaporizer body further includes a synchronous boost converter circuit coupled to the power source and to the power management circuit. The synchronous boost converter circuit is configured to receive the second voltage level from the power management circuit. The synchronous boost converter circuit is further configured to receive a third voltage level from the power source and is further configured to output, to a transistor, a fourth voltage level, the fourth voltage level higher than the third voltage level.

20 Claims, 9 Drawing Sheets

Related U.S. Application Data

(60) Provisional application No. 62/943,674, filed on Dec. 4, 2019.

(51) Int. Cl.
*A24F 40/46* (2020.01)
*H02M 3/158* (2006.01)
*H02J 7/00* (2006.01)

(56) References Cited

U.S. PATENT DOCUMENTS

| | | | |
|---|---|---|---|
| 5,878,752 A | 3/1999 | Adams et al. | |
| 5,894,394 A | 4/1999 | Baba et al. | |
| 6,155,268 A | 12/2000 | Takeuchi | |
| 7,275,866 B2 | 10/2007 | Tseng | |
| 8,113,855 B2 | 2/2012 | Green et al. | |
| 8,528,569 B1 | 9/2013 | Newton et al. | |
| 8,781,307 B2 | 7/2014 | Buzzetti et al. | |
| 8,961,492 B2 | 2/2015 | Imran et al. | |
| D725,310 S | 3/2015 | Eksouzian | |
| 9,312,687 B2 | 4/2016 | Xiang | |
| 9,549,573 B2 | 1/2017 | Monsees et al. | |
| 9,806,549 B2 | 10/2017 | Liberti et al. | |
| 10,085,481 B2 | 10/2018 | Verleur et al. | |
| 10,159,282 B2 | 12/2018 | Monsees et al. | |
| 10,638,792 B2 | 5/2020 | Christensen et al. | |
| 10,912,333 B2 | 2/2021 | Atkins et al. | |
| 11,590,296 B2 | 2/2023 | Hatton et al. | |
| 2003/0033055 A1 | 2/2003 | McRae et al. | |
| 2004/0050382 A1 | 3/2004 | Goodchild | |
| 2004/0081624 A1 | 4/2004 | Nguyen et al. | |
| 2006/0047368 A1 | 3/2006 | Maharajh et al. | |
| 2007/0277816 A1 | 12/2007 | Morrison et al. | |
| 2009/0230117 A1 | 9/2009 | Fernando et al. | |
| 2011/0155153 A1 | 6/2011 | Thorens et al. | |
| 2012/0048266 A1 | 3/2012 | Alelov | |
| 2012/0160251 A1 | 6/2012 | Hammel et al. | |
| 2012/0223673 A1 | 9/2012 | Chen et al. | |
| 2013/0023850 A1 | 1/2013 | Imran et al. | |
| 2013/0104916 A1 | 5/2013 | Tucker et al. | |
| 2013/0192615 A1 | 8/2013 | Tucker et al. | |
| 2014/0007891 A1 | 1/2014 | Liu | |
| 2014/0014126 A1 | 1/2014 | Peleg et al. | |
| 2014/0190496 A1 | 7/2014 | Wensley et al. | |
| 2014/0216484 A1 | 8/2014 | Liu | |
| 2014/0261408 A1 | 9/2014 | DePiano et al. | |
| 2014/0261486 A1 | 9/2014 | Potter et al. | |
| 2014/0270727 A1 | 9/2014 | Ampolini et al. | |
| 2014/0299141 A1 | 10/2014 | Flick | |
| 2014/0334804 A1 | 11/2014 | Choi | |
| 2014/0366898 A1 | 12/2014 | Monsees et al. | |
| 2015/0034104 A1 | 2/2015 | Zhou | |
| 2015/0053214 A1 | 2/2015 | Alarcon et al. | |
| 2015/0136158 A1 | 5/2015 | Stevens et al. | |
| 2015/0164138 A1 | 6/2015 | Liu et al. | |
| 2015/0164147 A1 | 6/2015 | Verleur et al. | |
| 2015/0173124 A1 | 6/2015 | Qiu et al. | |
| 2015/0196060 A1 | 7/2015 | Wensley et al. | |
| 2015/0208729 A1 | 7/2015 | Monsees et al. | |
| 2015/0216237 A1 | 8/2015 | Wensley et al. | |
| 2015/0237916 A1 | 8/2015 | Farine et al. | |
| 2015/0305409 A1 | 10/2015 | Verleur et al. | |
| 2015/0327596 A1 | 11/2015 | Alarcon et al. | |
| 2015/0357608 A1 | 12/2015 | Huang | |
| 2015/0357839 A1 | 12/2015 | Cai et al. | |
| 2015/0359263 A1 | 12/2015 | Bellinger | |
| 2016/0021933 A1 | 1/2016 | Thorens et al. | |
| 2016/0057811 A1 | 2/2016 | Tucker et al. | |
| 2016/0087469 A1 | 3/2016 | Armstrong | |
| 2016/0174611 A1 | 6/2016 | Monsees et al. | |
| 2016/0192706 A1 | 7/2016 | Kananen | |
| 2016/0255878 A1 | 9/2016 | Huang et al. | |
| 2016/0309780 A1 | 10/2016 | Chen et al. | |
| 2016/0309786 A1 | 10/2016 | Holtz et al. | |
| 2016/0315488 A1 | 10/2016 | Moon | |
| 2016/0360786 A1 | 12/2016 | Bellinger et al. | |
| 2017/0027234 A1 | 2/2017 | Farine et al. | |
| 2017/0049150 A1 | 2/2017 | Xue et al. | |
| 2017/0071257 A1 | 3/2017 | Lin et al. | |
| 2017/0079327 A1 | 3/2017 | Wu et al. | |
| 2017/0112196 A1 | 4/2017 | Sur et al. | |
| 2017/0119052 A1 | 5/2017 | Williams et al. | |
| 2017/0127726 A1 | 5/2017 | Xiang et al. | |
| 2017/0188636 A1 | 7/2017 | Li et al. | |
| 2017/0196263 A1 | 7/2017 | Sur et al. | |
| 2017/0196270 A1 | 7/2017 | Vick et al. | |
| 2017/0251725 A1 | 9/2017 | Buchberger et al. | |
| 2017/0280779 A1 | 10/2017 | Qui et al. | |
| 2017/0290371 A1 | 10/2017 | Davis et al. | |
| 2017/0294804 A1 | 10/2017 | Sur et al. | |
| 2017/0302089 A1 | 10/2017 | Bernauer et al. | |
| 2017/0327949 A1 | 11/2017 | Hidaka et al. | |
| 2018/0027879 A1 | 2/2018 | Gavrielov et al. | |
| 2018/0035714 A1 | 2/2018 | Sur et al. | |
| 2018/0041060 A1 | 2/2018 | Walley et al. | |
| 2018/0042306 A1 | 2/2018 | Atkins et al. | |
| 2018/0070635 A1 | 3/2018 | Litten | |
| 2018/0084608 A1 | 3/2018 | Bernauer et al. | |
| 2018/0090945 A1 | 3/2018 | Langlinais et al. | |
| 2018/0145374 A1 | 5/2018 | White et al. | |
| 2018/0199627 A1 | 7/2018 | Bowen et al. | |
| 2018/0279685 A1 | 10/2018 | Mayle et al. | |
| 2018/0280637 A1 | 10/2018 | Mayle et al. | |
| 2019/0159523 A1 | 5/2019 | Qiu | |
| 2019/0230987 A1 | 8/2019 | Wu et al. | |
| 2019/0313700 A1 | 10/2019 | Lord et al. | |
| 2019/0373679 A1 | 12/2019 | Fu et al. | |
| 2019/0373953 A1 | 12/2019 | Atkins et al. | |
| 2019/0387795 A1 | 12/2019 | Fisher et al. | |
| 2020/0000146 A1 | 1/2020 | Anderson et al. | |
| 2020/0022417 A1 | 1/2020 | Atkins et al. | |
| 2020/0037668 A1 | 2/2020 | Robert et al. | |
| 2020/0046033 A1 | 2/2020 | Robert et al. | |
| 2020/0107585 A1 | 4/2020 | Atkins et al. | |
| 2020/0114094 A1 | 4/2020 | Atkins et al. | |
| 2020/0128874 A1 | 4/2020 | Atkins et al. | |
| 2024/0245109 A1 | 7/2024 | Harrison et al. | |

FOREIGN PATENT DOCUMENTS

| | | |
|---|---|---|
| CN | 101419098 A | 4/2009 |
| CN | 101653354 A | 2/2010 |
| CN | 101806640 A | 8/2010 |
| CN | 202760174 U | 3/2013 |
| CN | 103777670 A | 5/2014 |
| CN | 103859604 A | 6/2014 |
| CN | 103912429 A | 7/2014 |
| CN | 203873004 U | 10/2014 |
| CN | 104142463 A | 11/2014 |
| CN | 105011375 A | 11/2015 |
| CN | 105209873 A | 12/2015 |
| CN | 204905326 U | 12/2015 |
| CN | 106579560 A | 4/2017 |
| CN | 105011375 | 12/2017 |
| CN | 206714080 U | 12/2017 |
| CN | 108463127 A | 8/2018 |
| CN | 108940704 A | 12/2018 |
| CN | 208490842 U | 2/2019 |
| CN | 109588779 A | 4/2019 |
| CN | 211123806 U | 7/2020 |
| CN | 211530993 U | 9/2020 |
| EP | 2895930 A2 | 7/2015 |
| EP | 3092909 A1 | 11/2016 |
| EP | 2959787 B1 | 4/2021 |
| EP | 3871539 A1 | 9/2021 |
| EP | 3809894 B1 | 6/2023 |
| JP | 2013113551 A | 6/2013 |
| JP | 2014530632 A | 11/2014 |
| JP | 2018505696 A | 3/2018 |
| KR | 20070112908 A | 11/2007 |
| KR | 101162688 B1 | 7/2012 |
| KR | 10-2015-0064754 A | 6/2015 |
| KR | 101667177 B1 | 12/2015 |
| KR | 10-2017-0137066 A | 12/2017 |

(56) References Cited

FOREIGN PATENT DOCUMENTS

| | | |
|---|---|---|
| RU | 2609394 C2 | 2/2017 |
| RU | 2637980 C2 | 12/2017 |
| RU | 2643422 C2 | 2/2018 |
| RU | 2646737 C2 | 3/2018 |
| RU | 2654619 C1 | 5/2018 |
| SG | 11201707778 | 10/2017 |
| TW | 200922096 A | 5/2009 |
| TW | 201620405 A | 6/2016 |
| WO | WO-2010118644 A1 | 10/2010 |
| WO | WO-2011137453 A2 | 11/2011 |
| WO | WO-2012085207 A1 | 6/2012 |
| WO | WO-2012120487 A2 | 9/2012 |
| WO | WO-2013004453 A2 | 1/2013 |
| WO | WO-2013060781 A1 | 5/2013 |
| WO | WO-2013120565 A3 | 3/2014 |
| WO | WO-2014040988 A1 | 3/2014 |
| WO | WO-2014102091 A1 | 7/2014 |
| WO | WO-2014144678 A2 | 9/2014 |
| WO | WO-2014166121 A1 | 10/2014 |
| WO | WO-2015071682 A1 | 5/2015 |
| WO | WO-2015100361 A1 | 7/2015 |
| WO | WO-2015137815 A1 | 9/2015 |
| WO | WO-2015165747 A1 | 11/2015 |
| WO | WO-2016050247 A1 | 4/2016 |
| WO | WO-2016058187 A1 | 4/2016 |
| WO | WO-2016082136 A1 | 6/2016 |
| WO | WO-2016101200 A1 | 6/2016 |
| WO | WO-2016145634 A1 | 9/2016 |
| WO | WO-2017020220 A1 | 2/2017 |
| WO | WO-2017072705 A2 | 5/2017 |
| WO | WO-2017085242 A1 | 5/2017 |
| WO | WO-2018055761 A1 | 3/2018 |
| WO | WO-2018094418 A1 | 5/2018 |
| WO | WO-2018107494 A1 | 6/2018 |
| WO | WO-2018122411 A1 | 7/2018 |
| WO | WO-2018153171 A1 | 8/2018 |
| WO | WO-2018202403 A1 | 11/2018 |
| WO | WO-2020006305 A1 | 1/2020 |
| WO | WO-2020084756 A1 | 4/2020 |

OTHER PUBLICATIONS (Jun. 15, 2021) How to Measure Resistance—Hioki, https://www.hioki.com/en/learning/methods/resistancemeasurement-methods.html/.

Low Level Measurements Handbook—7th Edition Precision DC Current, Voltage, and Resistance Measurements.

(Jun. 15, 2021) Resistance thermometer, https://en.wikipedia.org/wiki/Resistance_thermometer.

(Jun. 15, 2021) Room temperature, https://en.wikipedia.org/wiki/Room_temperature.

Dittmer, Greg (2008) Synchronous Boost Converters Provide High Voltage without the Heat, Linear technology magazine, 19-37 pages.

Tony R. Kuphaldt (2006) "Temperature coefficient of resistance", Lessons in Electric Circuits, vol. 1 DC, section 12.6.

(Nov. 12, 2016) BYJU'S, Ohm's Law, https://byjus.com/physics/ohms-law/, 19 pages.

\* cited by examiner

BOOST CONVERTER (10W)

HIGH-POWER DRIVE CIRCUIT FOR A VAPORIZER HEATER

CROSS-REFERENCE TO RELATED APPLICATIONS

This application is a bypass continuation and claims priority to PCT/US2020/063147, filed on Dec. 3, 2020 and entitled "High-Power Drive Circuit for a Vaporizer Heater" which claims priority to U.S. Provisional Patent Application Ser. No. 62/943,674 filed on Dec. 4, 2019, entitled "High-Power Drive Circuit for a Vaporizer Heater", the disclosures of which are incorporated by reference herein in their entirety to the extent permitted.

TECHNICAL FIELD

The subject matter described herein relates to vaporizer devices, such as portable personal vaporizer devices for generating an inhalable aerosol from one or more vaporizable materials and including a heating element powered by utilizing a voltage booster circuit and a synchronous boost converter (SBC).

BACKGROUND

Vaporizer devices, which can also be referred to as vaporizers, electronic vaporizer devices or e-vaporizer devices, can be used for delivery of an aerosol (or "vapor") containing one or more active ingredients by inhalation of the aerosol by a user of the vaporizing device. For example, electronic nicotine delivery systems (ENDS) include a class of vaporizer devices that are battery powered and that may be used to simulate the experience of smoking, but without burning of tobacco or other substances.

In use of a vaporizer device, the user inhales an aerosol, commonly called vapor, which may be generated by a heating element that vaporizes (e.g., causing a liquid or solid to at least partially transition to the gas phase) a vaporizable material, which may be liquid, a solution, a solid, a wax, or any other form as may be compatible with use of a specific vaporizer device. The vaporizable material used with a vaporizer can be provided within a cartridge (e.g., a separable part of the vaporizer that contains the vaporizable material in a reservoir) that includes a mouthpiece (e.g., for inhalation by a user).

To receive the inhalable aerosol generated by a vaporizer device, a user may, in certain examples, activate the vaporizer device by taking a puff, by pressing a button, or by some other approach. A puff, as the term is generally used (and also used herein), refers to inhalation by the user in a manner that causes a volume of air to be drawn into the vaporizer device such that the inhalable aerosol is generated by a combination of vaporized vaporizable material with the air.

A typical approach by which a vaporizer device generates an inhalable aerosol from a vaporizable material involves heating the vaporizable material in a vaporization chamber (or a heater chamber) to cause the vaporizable material to be converted to the gas (or vapor) phase. A vaporization chamber generally refers to an area or volume in the vaporizer device within which a heat source (e.g., conductive, convective, and/or radiative) causes heating of a vaporizable material to produce a mixture of air and vaporized vaporizable material to form a vapor for inhalation by a user of the vaporization device.

Currently available vaporizers often include one or more battery cells, such as non-rechargeable primary battery cells and/or rechargeable secondary battery cells, as a power source. The power source may power a heating element to convert the vaporizable material to the gas or vapor. Powering the heating element may consume a large amount of power and may quickly drain the one or more battery cells and/or result in inconsistent power output. For example, the amount of power delivered from the power source may be limited by battery voltage/size, heater resistance, and/or efficiency losses. As such, improved vaporization devices and/or vaporization cartridges that improve upon or overcome these issues are desired.

SUMMARY

In certain aspects of the current subject matter, challenges associated with the presence of liquid vaporizable materials in or near certain susceptible components of an electronic vaporizer device may be addressed by inclusion of one or more of the features described herein or comparable/equivalent approaches as would be understood by one of ordinary skill in the art. Aspects of the current subject matter relate to methods and system for controlling power to a heating element of a vaporizer device.

In one aspect, a vaporizer system is described. The vaporizer system includes a vaporizer body. The vaporizer body further includes a power source configured to supply power to a heating element of the cartridge when the cartridge is coupled to the vaporizer device body. The vaporizer body further includes a controller configured to activate a signal configured to control the supplied power to the heating element. The vaporizer body further includes a power management circuit coupled to the power source. The power management circuit is configured to receive a first voltage level from the power source. The power management circuit is further configured to output a second voltage level, the second level voltage higher than the first voltage level. The vaporizer body further includes a synchronous boost converter circuit coupled to the power source and to the power management circuit. The synchronous boost converter circuit is configured to receive the second voltage level from the power management circuit, the second voltage level sufficient to power the synchronous boost converter circuit. The synchronous boost converter circuit is further configured to receive a third voltage level from the power source. The synchronous boost converter circuit is further configured to output, to a transistor, a fourth voltage level, the fourth voltage level higher than the third voltage level and sufficient to power the heating element. The transistor is coupled to the heating element and configured to output the fourth voltage level to the heating element in response to the controller activating the signal. The cartridge includes a vaporization chamber configured to hold a vaporizable material. The cartridge further includes the heating element configured to heat the vaporizable material within a threshold temperature range. The heating of the vaporizable material generates the inhalable aerosol comprising the vaporizable material.

In one aspect a method is described. The method includes receiving, at a power management circuit, a first voltage level from a power source. The method further includes outputting, at the power management circuit, a second voltage level. The second voltage level being higher than the first voltage level. The method further includes receiving, at a synchronous boost converter circuit, the second voltage level from the power management circuit. The second voltage level being sufficient to power the synchronous boost converter circuit. The method further including receiving, at the synchronous boost converter circuit, a third voltage level from the power source. The method further includes outputting, by the synchronous boost converter circuit to a transistor, a fourth voltage level. The fourth voltage level being higher than the third voltage level and sufficient to power a heating element of a vaporizer. The method further includes outputting the fourth voltage level to the heating element.

In one aspect, a vaporizer device is described. The vaporizer device includes a vaporizer body. The vaporizer body further includes a power source configured to supply power to a heating element of the cartridge when the cartridge is coupled to the vaporizer device body. The vaporizer body further includes a first boost converter circuit coupled to the power source. The first boost converter circuit configured to receive a first voltage level from the power source. The first boost converter circuit further configured to output a second voltage level. The vaporizer body further includes a second boost converter circuit coupled to the power source and coupled to the first boost converter circuit. The second boost converter circuit configured to receive the second voltage level from the first boost converter circuit. The second voltage level being sufficient to power the second boost converter circuit. The second boost converter circuit further configured to receive a third voltage level from the power source. The second boost converter circuit further configured to output, to the heating element, a fourth voltage level. The fourth voltage level higher than the third voltage level and sufficient to power the heating element.

In some variations, one or more of the following features may optionally be included in any feasible combination. The vaporizer body may include a receptacle configured to releasably couple to a cartridge. The cartridge may include a vaporization chamber configured to hold the vaporizable material. The cartridge may further include the heating element configured to heat the vaporizable material within a threshold temperature range. The heating of the vaporizable material may generate an inhalable aerosol including the vaporizable material. The threshold temperature range may be below a combustion level of the vaporizable material. The second voltage level may be at least 5V. The vaporizer device may include a heat not burn device. The controller may be configured to activate the signal in response to a sensor detecting a puff on the cartridge. The power management circuit may be configured to provide power to the controller. The transistor may include a metal oxide semiconductor field effect transistor. The synchronous boost converter circuit may include an integrated circuit configured to provide synchronous rectification. The power management circuit may include a capacitor configured to filter and output voltage to reduce voltage changes and to provide a consistent output voltage. The transistor may be coupled to the heating element and may be configured to output the fourth voltage level to the heating element. The method may further include activating a signal to control a supplied power to the heating element. Activating the signal may include activating, in response to a sensor detecting a puff on the vaporizer, the signal. The vaporizer device may include a transistor coupled to the heating element and coupled to the second boost converter circuit. The transistor may be configured to power the heating element in response to a controller activating a signal to control power supplied to the heating element.

The second voltage level may be higher than the first voltage level. The fourth voltage level may be higher than the second voltage level.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Implementations of the current subject matter include devices relating to vaporizing of one or more materials for inhalation by a user. The term "vaporizer" is used generically in the following description to refer to a vaporizer device. Examples of vaporizers consistent with implementations of the current subject matter include electronic vaporizers or the like. Such vaporizers are generally portable, hand-held devices that heat a vaporizable material to provide an inhalable dose of the material.

The vaporizable material used with a vaporizer may optionally be provided within a cartridge (e.g., a part of the vaporizer that contains the vaporizable material in a reservoir or other container and that can be refillable when empty or disposable in favor of a new cartridge containing additional vaporizable material of a same or different type). A vaporizer may be a cartridge-using vaporizer, a cartridge-less vaporizer, or a multi-use vaporizer capable of use with or without a cartridge. For example, a multi-use vaporizer may include a heating chamber (e.g., an oven) configured to receive a vaporizable material directly in the heating chamber and also to receive a cartridge or other replaceable device having a reservoir, a volume, or the like for at least partially containing a usable amount of vaporizable material.

In various implementations, a vaporizer may be configured for use with liquid vaporizable material (e.g., a carrier solution in which an active and/or inactive ingredient(s) are suspended or held in solution or a neat liquid form of the vaporizable material itself) or a solid vaporizable material. A solid vaporizable material may include a plant material that emits some part of the plant material as the vaporizable material (e.g., such that some part of the plant material remains as waste after the vaporizable material is emitted for inhalation by a user) or optionally can be a solid form of the vaporizable material itself (e.g., a "wax") such that all of the solid material can eventually be vaporized for inhalation. A liquid vaporizable material can likewise be capable of being completely vaporized or can include some part of the liquid material that remains after all of the material suitable for inhalation has been consumed.

Figure 1A:
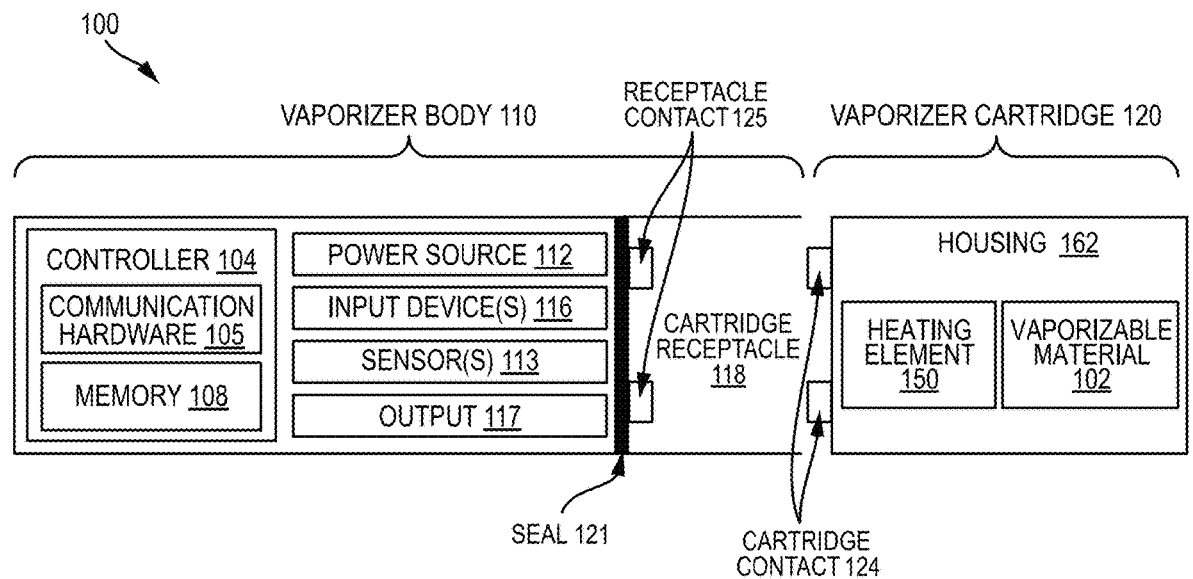
FIG. 1A illustrates a block diagram of a vaporizer consistent with implementations of the current subject matter.

Referring to the block diagram of FIG. 1A, a vaporizer 100 typically includes a power source 112 (such as a battery which may be a rechargeable battery), and a controller 104 (e.g., a processor, circuitry, etc. capable of executing logic) for controlling delivery of heat to a heating element 150 to cause a vaporizable material 102 to be converted from a condensed form (e.g., a solid, a liquid, a solution, a suspension, a part of an at least partially unprocessed plant material, etc.) to the gas phase. The controller 104 may be part of one or more printed circuit boards (PCBs) consistent with certain implementations of the current subject matter.

After conversion of the vaporizable material to the gas phase, and depending on the type of vaporizer, the physical and chemical properties of the vaporizable material, and/or other factors, at least some of the gas-phase vaporizable material may condense to form particulate matter in at least a partial local equilibrium with the gas phase as part of an aerosol, which can form some or all of an inhalable dose provided by the vaporizer 100 for a given puff or draw on the vaporizer.

The heating element 150 can be or include one or more of a conductive heater, a radiative heater, and a convective heater. One type of heating element is a resistive heating element, which can be constructed of or at least include a material (e.g., a metal or alloy, for example a nickel-chromium alloy, or a non-metallic resistor) configured to dissipate electrical power in the form of heat when electrical current is passed through one or more resistive segments of the heating element. In some implementations of the current subject matter, an atomizer 141 can include a heating element that includes a resistive coil or other heating element wrapped around, positioned within, integrated into a bulk shape of, pressed into thermal contact with, or otherwise arranged to deliver heat to a wicking element to cause a liquid vaporizable material drawn by the wicking element from a reservoir to be vaporized for subsequent inhalation by a user in a gas and/or a condensed (e.g., aerosol particles or droplets) phase. Other wicking element, heating element, and/or atomizer assembly configurations are also possible, as discussed further below.

Certain vaporizers may also or alternatively be configured to create an inhalable dose of gas-phase and/or aerosol-phase vaporizable material via heating of a non-liquid vaporizable material, such as for example a solid-phase vaporizable material (e.g., a wax or the like) or plant material (e.g., tobacco leaves and/or parts of tobacco leaves) containing the vaporizable material. In such vaporizers, a resistive heating element may be part of or otherwise incorporated into or in thermal contact with the walls of an oven or other heating chamber into which the non-liquid vaporizable material is placed. Alternatively, a resistive heating element or elements may be used to heat air passing through or past the non-liquid vaporizable material to cause convective heating of the non-liquid vaporizable material. In still other examples, a resistive heating element or elements may be disposed in intimate contact with plant material such that direct conductive heating of the plant material occurs from within a mass of the plant material (e.g., as opposed to only by conduction inward form walls of an oven).

The heating element 150 may be activated (e.g., by a controller, which is optionally part of a vaporizer body as discussed below, may cause current to pass from the power source through a circuit including the resistive heating element, which is optionally part of a vaporizer cartridge as discussed below), in association with a user puffing (e.g., drawing, inhaling, etc.) on a mouthpiece of the vaporizer to cause air to flow from an air inlet, along an airflow path that passes an atomizer (e.g., wicking element and heating element), optionally through one or more condensation areas or chambers, to an air outlet in the mouthpiece. Incoming air passing along the airflow path passes over, through, etc. the atomizer 141, where gas phase vaporizable material is entrained into the air. As noted above, the entrained gas-phase vaporizable material may condense as it passes through the remainder of the airflow path such that an inhalable dose of the vaporizable material in an aerosol form can be delivered from the air outlet (e.g., in a mouthpiece for inhalation by a user).

Activation of the heating element 150 may be caused by automatic detection of the puff based on one or more of signals generated by one or more sensors 113, such as for example a pressure sensor or sensors disposed to detect pressure along the airflow path relative to ambient pressure (or optionally to measure changes in absolute pressure), one or more motion sensors of the vaporizer, one or more flow sensors of the vaporizer, a capacitive lip sensor of the vaporizer; in response to detection of interaction of a user with one or more input devices 116 (e.g., buttons or other tactile control devices of the vaporizer 100), receipt of signals from a computing device in communication with the vaporizer; and/or via other approaches for determining that a puff is occurring or imminent.

As alluded to in the previous paragraph, a vaporizer consistent with implementations of the current subject matter may be configured to connect (e.g., wirelessly or via a wired connection) to a computing device (or optionally two or more devices) in communication with the vaporizer. To this end, the controller 104 may include communication hardware 105. The controller 104 may also include a memory 108. A computing device can be a component of a vaporizer system that also includes the vaporizer 100, and can include its own communication hardware, which can establish a wireless communication channel with the communication hardware 105 of the vaporizer 100. For example, a computing device used as part of a vaporizer system may include a general purpose computing device (e.g., a smartphone, a tablet, a personal computer, some other portable device such as a smartwatch, or the like) that executes software to produce a user interface for enabling a user of the device to interact with a vaporizer. In other implementations of the current subject matter, such a device used as part of a vaporizer system can be a dedicated piece of hardware such as a remote control or other wireless or wired device having one or more physical or soft (e.g., configurable on a screen or other display device and selectable via user interaction with a touch-sensitive screen or some other input device like a mouse, pointer, trackball, cursor buttons, or the like) interface controls. The vaporizer can also include one or more output 117 features or devices for providing information to the user.

In the example in which a computing device provides signals related to activation of the resistive heating element, or in other examples of coupling of a computing device with a vaporizer for implementation of various control or other functions, the computing device executes one or more computer instructions sets to provide a user interface and underlying data handling. In one example, detection by the computing device of user interaction with one or more user interface elements can cause the computing device to signal the vaporizer 100 to activate the heating element, either to a full operating temperature for creation of an inhalable dose of vapor/aerosol. Other functions of the vaporizer may be controlled by interaction of a user with a user interface on a computing device in communication with the vaporizer.

The temperature of a resistive heating element of a vaporizer may depend on a number of factors, including an amount of electrical power delivered to the resistive heating element and/or a duty cycle at which the electrical power is delivered, conductive heat transfer to other parts of the electronic vaporizer and/or to the environment, latent heat losses due to vaporization of a vaporizable material from the wicking element and/or the atomizer 141 as a whole, and convective heat losses due to airflow (e.g., air moving across the heating element or the atomizer 141 as a whole when a user inhales on the electronic vaporizer). As noted above, to reliably activate the heating element or heat the heating element to a desired temperature, a vaporizer may, in some implementations of the current subject matter, make use of signals from a pressure sensor to determine when a user is inhaling. The pressure sensor can be positioned in the airflow path and/or can be connected (e.g., by a passageway or other path) to an airflow path connecting an inlet for air to enter the device and an outlet via which the user inhales the resulting vapor and/or aerosol such that the pressure sensor experiences pressure changes concurrently with air passing through the vaporizer device from the air inlet to the air outlet. In some implementations of the current subject matter, the heating element may be activated in association with a user's puff, for example by automatic detection of the puff, for example by the pressure sensor detecting a pressure change in the airflow path.

Typically, the pressure sensor (as well as any other sensors 113) can be positioned on or coupled (e.g., electrically or electronically connected, either physically or via a wireless connection) to the controller 104 (e.g., a printed circuit board assembly or other type of circuit board). To take measurements accurately and maintain durability of the vaporizer, it can be beneficial to provide a resilient seal 121 to separate an airflow path from other parts of the vaporizer. The seal 121, which can be a gasket, may be configured to at least partially surround the pressure sensor such that connections of the pressure sensor to internal circuitry of the vaporizer are separated from a part of the pressure sensor exposed to the airflow path. In an example of a cartridge-based vaporizer, the seal 121 may also separate parts of one or more electrical connections between a vaporizer body 110 and a vaporizer cartridge 120. Such arrangements of a seal 121 in a vaporizer 100 can be helpful in mitigating against potentially disruptive impacts on vaporizer components resulting from interactions with environmental factors such as water in the vapor or liquid phases, other fluids such as the vaporizable material, etc. and/or to reduce escape of air from the designed airflow path in the vaporizer.

A general class of vaporizers that have recently gained popularity includes a vaporizer body 110 that includes a controller 104, a power source 112 (e.g., battery), one more sensors 113, charging contacts, a seal 121, and a cartridge receptacle 118 configured to receive a vaporizer cartridge 120 for coupling with the vaporizer body 110 through one or more of a variety of attachment structures. In some examples, vaporizer cartridge 120 includes a mouthpiece for delivering an inhalable dose to a user. The vaporizer body 110 can include an atomizer 141 having a heating element 150, or alternatively, the heating element 150 can be part of the vaporizer cartridge 120.

As noted above, the current subject matter relates to cartridge-based configurations for vaporizers that generate an inhalable dose of a vaporizable material via heating of a source substance. For example, a vaporizer cartridge 120 may include a mass of a source substance that is processed and formed to have direct contact with parts of one or more resistive heating elements, and such a vaporizer cartridge 120 may be configured to be coupled mechanically and electrically to a vaporizer body 110 that includes a processor, a power source 112, and electrical contacts for connecting to corresponding cartridge contacts 124 for completing a circuit with the one or more resistive heating elements.

In vaporizers in which the power source 112 is part of a vaporizer body 110 and a heating element 150 is disposed in a vaporizer cartridge 120 configured to couple with the vaporizer body 110, the vaporizer 100 may include electrical connection features (e.g., means for completing a circuit) for completing a circuit that includes the controller 104 (e.g., a printed circuit board, a microcontroller, or the like), the power source 112, and the heating element 150. These features may include at least two contacts on one or more outer surfaces of the vaporizer cartridge 120 (referred to herein as cartridge contacts 124) and at least two contacts disposed on the vaporizer body 110, optionally in a cartridge receptacle 118 (referred to herein as receptacle contacts 125) of the vaporizer 100 such that the cartridge contacts 124 and the receptacle contacts 125 make electrical connections when the vaporizer cartridge 120 is inserted into and coupled with the cartridge receptacle 118. Other configurations in which a vaporizer cartridge 120 is coupled to a vaporizer body 110 without being inserted into a cartridge receptacle 118 are also within the scope of the current subject matter. The circuit completed by these electrical connections can allow delivery of electrical current to the resistive heating element 150 and may further be used for additional functions, such as for example for measuring a resistance of the resistive heating element 150 for use in determining and/or controlling a temperature of the resistive heating element 150 based on a thermal coefficient of resistivity of the resistive heating element 150, for identifying a cartridge based on one or more electrical characteristics of a resistive heating element 150 or the other circuitry of the vaporizer cartridge 120, etc.

In some examples, the at least two cartridge contacts 124 and the at least two receptacle contacts 125 can be configured to electrically connect in either of at least two orientations. The vaporizer cartridge 120 may be reversibly insertable into a cartridge receptacle 118 of the vaporizer body 110.

The at least two cartridge contacts 124 and the at least two receptacle contacts 125 can take various forms. For example, one or both sets of contacts may include conductive pins, tabs, posts, receiving holes for pins or posts, or the like. Some types of contacts may include springs or other urging features to cause better physical and electrical contact between the contacts on the vaporizer cartridge 120 and the vaporizer body 110. The electrical contacts may optionally be gold-plated, and/or can include other materials.

Various embodiments of a vaporizer cartridge 120 are described herein that are configured for containing and vaporizing one or more non-liquid source substances, such as loose-leaf tobacco. Furthermore, such embodiments of vaporizer cartridges may be single-use such that they are not refillable after the vaporizable material has been used up. Such single-use vaporizer cartridges may thus require inexpensive material and manufacturing in order to be economically feasible. Furthermore, although it may be desirable to make and manufacture single-use vaporizer cartridges for vaporizing non-liquid source substances, it is also desirable to efficiently and effectively vaporize the vaporizable material. For example, a user inhaling on a vaporizer device typically prefers inhaling aerosol created by the vaporizer device shortly after engaging with the vaporizer device (e.g., placing lips on mouthpiece, pushing an activation button, etc.). As such, the embodiments of the vaporizer cartridges disclosed herein may beneficially achieve efficient vaporization of vaporizable material from a source substance to achieve a desired user experience. Furthermore, embodiments of the vaporizer cartridge 120 disclosed herein may advantageously provide sufficient heat energy to the source substance to cause release of the vaporizable material such as to create an aerosol form of the vaporizable material for inhalation, while also limiting heating sufficiently to at least reduce creation of at least one harmful by-product that is not desired for a user to inhale. To achieve the above, various embodiments of heating elements are disclosed and described in greater detail below.

For example, various embodiments of heating elements are described herein that are configured to heat within a desired temperature range, such as at or below approximately 250 degrees Celsius. Such a temperature range may advantageously vaporize a source substance such as processed tobacco and allow nicotine and volatile flavor compounds to be aerosolized and delivered to a user puffing on the associated vaporization device. Such a temperature within the temperature range may also prevent the creation of at least one harmful or potentially harmful by-product. As such, at least one benefit of the heating assemblies described herein include the improved quality of aerosol for inhalation by a user.

In addition, various embodiments of the heating elements described herein may efficiently heat up to a temperature within the desired temperature range. This can allow the associated vaporizer device to achieve a desired user experience for the user inhaling on the vaporizer device. Such efficient heat-up time can result in efficient power usage, such as battery power from the vaporizer device. Furthermore, the various embodiments of the heating elements described herein can achieve such benefits while not requiring an increase in vaporizer device size. In some embodiments, the heating element can allow for a more compact vaporizer device than what is currently available. In addition, embodiments of the heating element can be made and manufactured at a cost that may allow the vaporizer cartridge to be single-use and economically feasible.

Embodiments of the heating elements described below can include at least one thermally conductive material, such as carbon, carbon foam, metal, metal foil, aluminum foam, or a biodegradable polymer. The thermally conductive material can allow energy provided by a vaporizer device to be transmitted to the thermally conductive feature (e.g., via the cartridge and vaporizer device contacts) to thereby cause an increase in temperature along at least a part of the thermally conductive feature, such as for vaporizing the vaporizable material from the source substance. The vaporizer body 110 can include a controller 104 that can control the amount of energy provided to the thermally conductive material, thereby assisting the heating element 150 with reaching a temperature that is within the desired temperature range.

The at least two cartridge contacts and the at least two receptacle contacts can take various forms. For example, one or both sets of contacts may include conductive pins, tabs, posts, receiving holes for pins or posts, or the like. Some types of contacts may include springs or other urging features to cause better physical and electrical contact between the contacts on the vaporizer cartridge and the vaporizer body. The electrical contacts may optionally be gold-plated, and/or can include other materials.

Figure 1B:
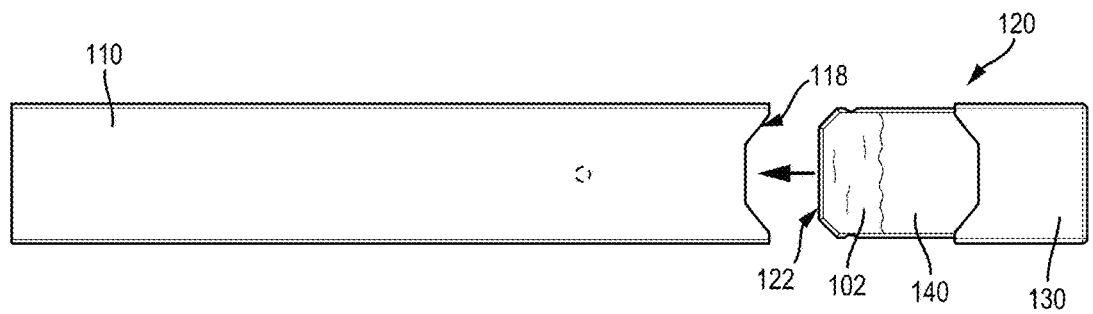
FIGS. 1B-1F illustrate example variations of a vaporizer and cartridge assembly consistent with implementations of the current subject matter.

FIG. 1B illustrates an embodiment of the vaporizer device body 110 having a cartridge receptacle 118 into which the cartridge 120 may be releasably inserted. FIG. 1B shows a top view of the vaporization device 100 illustrating the cartridge being positioned for insertion into the vaporizer device body 110. When a user puffs on the vaporization device 100, air may pass between an outer surface of the cartridge 120 and an inner surface of a cartridge receptacle 118 on the vaporizer device body 110. Air can then be drawn into an insertable end 122 of the cartridge, through the vaporization chamber that includes or contains the heating element and/or wick, and out through an outlet of the mouthpiece 130 for delivery of the inhalable aerosol to a user. The reservoir 140 of the cartridge 120 may be formed in whole or in part from translucent material such that a level of vaporizable material 102 is visible along the cartridge 120.

Figure 1C:
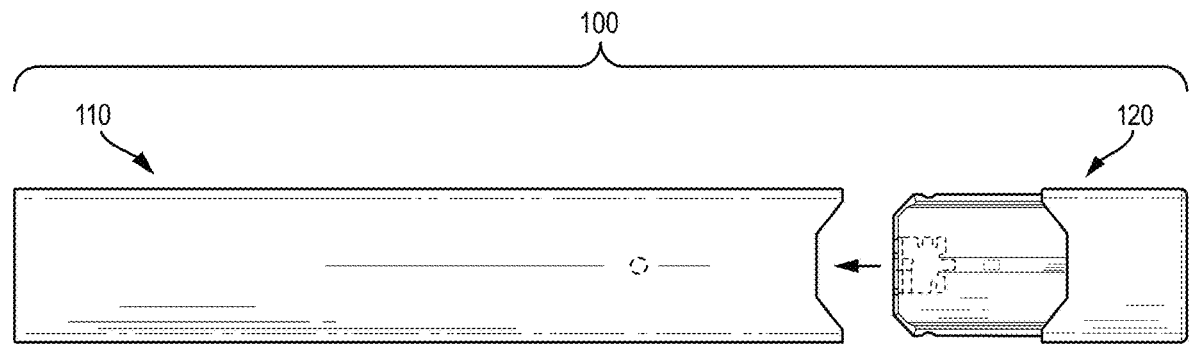
Figure 1D:
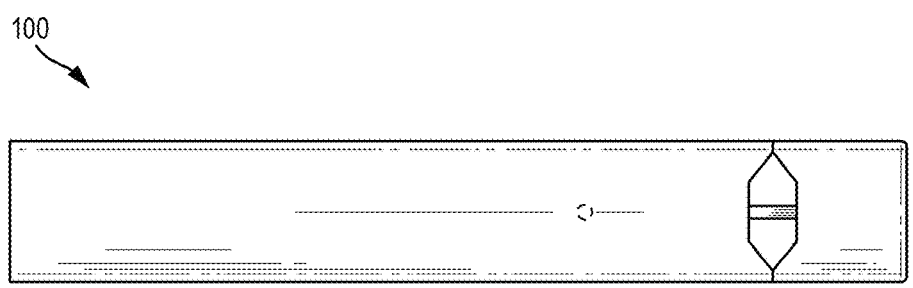
Figure 1E:
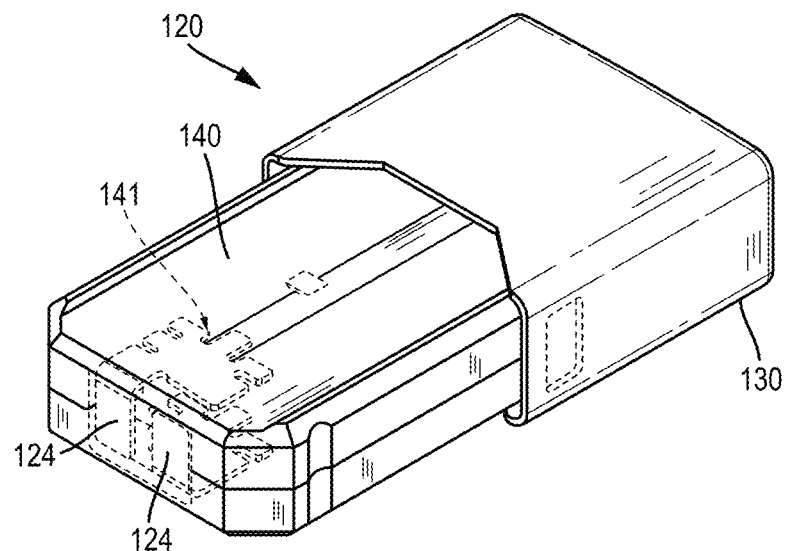
Figure 1F:
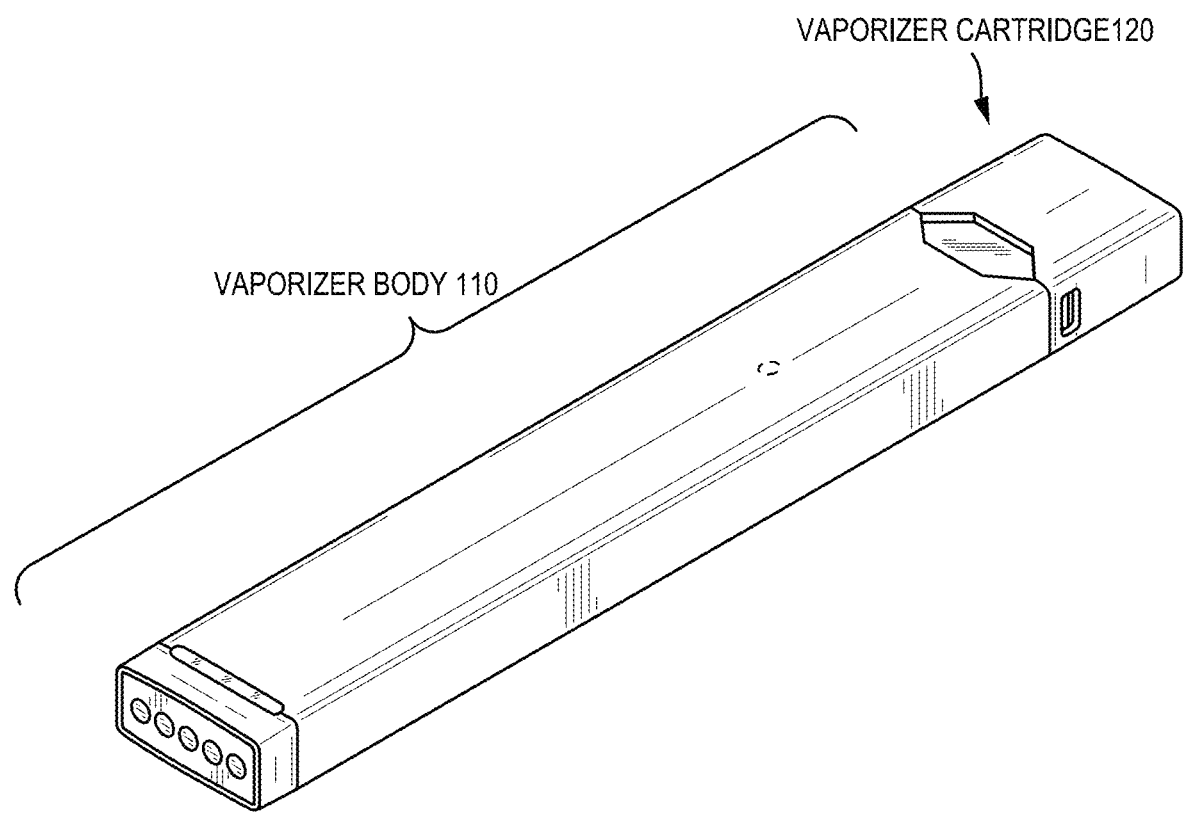

FIGS. 1C and 1D show top views before and after connecting a cartridge 120 to a vaporizer body 110. FIG. 1E shows a perspective view of one variation of a cartridge 120 holding a liquid vaporizable material. In general, when a vaporizer includes a cartridge (such as the cartridge 120), the cartridge 120 may include one or more reservoirs 140 of vaporizable material. Any appropriate vaporizable material may be contained within the reservoir 140 of the cartridge 120, including solutions of nicotine or other organic materials.

FIGS. 1B to 1F illustrate an example of a vaporizer 100 with a vaporizer body 110 and cartridge 120. Vaporizer body 110 and cartridge 120 are shown unconnected in FIGS. 1B and 1C and connected in FIG. 1D. FIG. 1D shows a perspective view of the combined vaporizer body 110 and cartridge 120, and FIG. 1E shows an individual cartridge 120. FIGS. 1B-1F show an example including many of the features generally shown in FIG. 1A. Other configurations, including some or all of the features described herein, are also within the scope of the current subject matter.

Some vaporizer devices 100 may heat materials having origin as plant leaves or other plant components in order to extract plant specific flavor aromatics and other products as vapor. These plant materials may be chopped and blended into a homogenized construct with a variety of plant products that may include tobacco, in which case nicotine and/or nicotine compounds may be produced and delivered in aerosol form to the user of such a vaporizer device. The homogenized construct may also include vaporizable liquids such as, but not limited to, propylene glycol and glycerol in order to enhance the vapor density and aerosol produced when heated. Such products to be heated can be referred to as product. In order to avoid production of unwanted harmful or potentially harmful constituents (HPHCs) vaporizer devices of this type benefit from heaters having temperature control means. Such vaporizer devices that heat plant leaves or homogenized construct as described above such that temperatures are kept below combustion levels are generally referred to as heat not burn (HNB) devices.

Heat Not Burn (HNB) vaporizers and those that heat via convection may require large amounts of energy to generate vapor. This presents a challenge for small, battery powered vaporizers, as the amount of power that can be delivered is limited by battery voltage, heater resistance, and efficiency losses. To address this challenge, vaporizers may require longer preheat times so that a sufficient amount of energy can be applied to the vaporizable material. However, the long preheat times may present an inconvenience to a vaporizer user. Vaporizers may also address this challenge by including multi-cell batteries. However, using more than one battery cell may significantly increase the size of a vaporizer device and require more complex battery management circuitry. Multi-cell batteries may also result in an inconsistent power delivery over a battery discharge cycle due to battery voltage may drop to a lower voltage level at a lower state of charge of the multi-cell battery (e.g., when the battery is at a low charge level). Further, a vaporizer may include a low resistance heater to increase power output. However, the low resistance may place significant constraints on heater material and geometry, and a higher current resulting from a lower resistance may result in higher losses and reduce efficiency. Additionally, the low resistance heater may also result in inconsistent power output due to a changing battery state of charge.

There is another option for maintaining a high, consistent power output, which is to use a DC/DC converter circuit to boost voltage from the battery before applying it to the heater (e.g., a heating element of the cartridge 120). A properly designed circuit can deliver a high power output regardless of battery state of charge and heater resistance. Additionally, by applying more voltage and less current for a given power output, losses due to contact resistance may be minimized and more power may reach the heating element.

Embodiments of the heating elements described below can include at least one thermally conductive material, such as carbon, carbon foam, metal, metal foil, aluminum foam, or a biodegradable polymer. The thermally conductive material can allow energy provided by a vaporizer device to be transmitted to the thermally conductive feature (e.g., via the cartridge and vaporizer device contacts) to thereby cause an increase in temperature along at least a part of the thermally conductive feature, such as for vaporizing the vaporizable material from the source substance. The vaporizer body 110 can include a controller 104 that can control the amount of energy provided to the thermally conductive material, thereby assisting the heating element 150 with reaching a temperature that is within the desired temperature range.

In some embodiments, a vaporizer cartridge can include a housing 162 configured to contain at least some of the vaporizable material 102 and/or heating element 150.

Figure 2A:
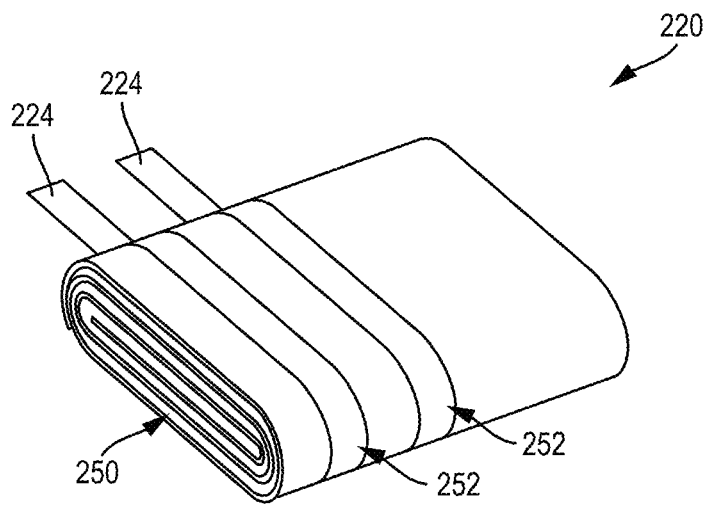
FIG. 2A illustrates a perspective view of an embodiment of a vaporizer cartridge including an embodiment of a heating element having a flexible sheet with narrow conductive traces extending therealong.
Figure 2B:
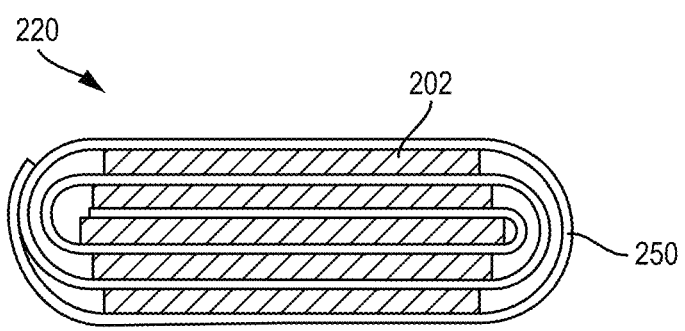
FIG. 2B illustrates an end view of the vaporizer cartridge of FIG. 2A showing the flexible sheets of the heating element wrapped around non-liquid vaporizable material.

FIGS. 2A-2B illustrate an embodiment of a vaporizer cartridge 220 including an embodiment of a heating element 250 including a flexible sheet with narrow electrically conductive traces 252 extending therealong. These narrow electrically conductive traces 252 may form resistive heaters, which can be arranged in series or parallel. The narrow electrically conductive traces 252 can be made out of an electrically conductive material, such as any of the electrically conductive materials described herein. The heating element 250 can include at least one cartridge contact 224 that is in electrical communication with the narrow electrically conductive traces. The cartridge contacts 224 can be positioned such that when the vaporizer cartridge 220 is coupled to a vaporizer body, the cartridge contacts 224 can mate with the receptacle contacts 125 (shown in FIG. 1) of the vaporizer body. This can allow energy from the vaporizer body to be transferred from the vaporizer body to the narrow electrically conductive traces 224 (via the contact between the cartridge contacts 224 and the receptacle contacts 125) thereby allowing the narrow electrically conductive traces 252 to reach a temperature within the desired temperature range.

In some embodiments, the flexible sheet can wrap around non-liquid source substance 202, such as a plurality of sheets of tobacco, as shown in FIG. 2B. In such a configuration, the heating element 250 can both define a chamber configured to contain the source substance 202, as well as be contained within the chamber. This can increase the contact between the source substance 202 and the heating element 150, thereby allowing the heating element 150 to efficiently heat up and vaporize the vaporizable material from the source substance 202. Furthermore, a thermal gradient across the source substance 202 can be minimal (e.g., less than or equal to the width of a tobacco sheet) in such a configuration. This can allow the heating element 150 to heat to a temperature within the desired temperature range while also efficiently vaporizing an acceptable fraction (ideally but not necessarily all or substantially all) of the vaporizable material contained within the source substance 202 in the chamber. As described herein, the amount of power required to heat the heating element 150 within the desired temperature range may be large and affect battery and/or heater performance. The example implementations of voltage booster circuits described herein may address the power requirements in HNB embodiments.

Figure 3:
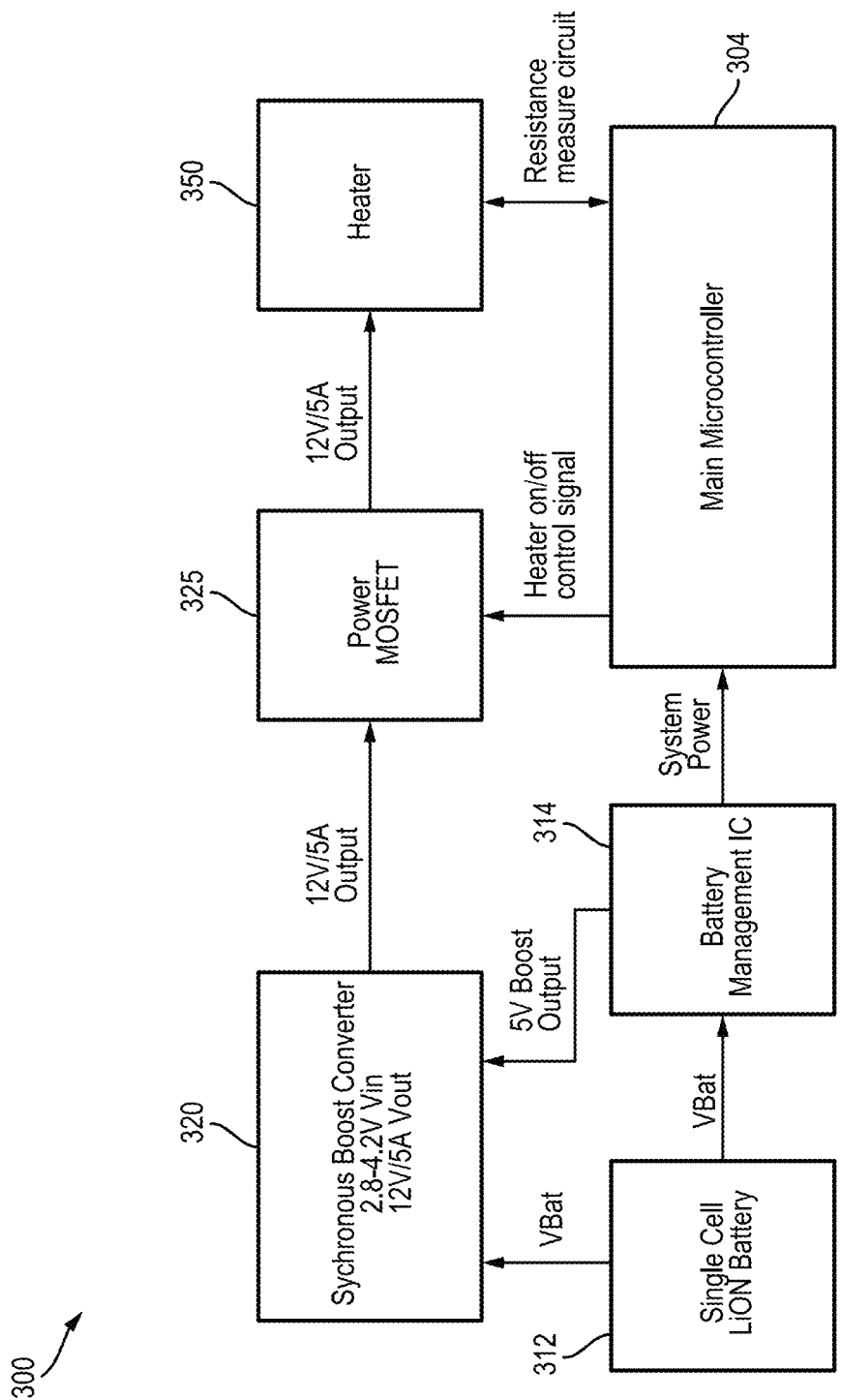
FIG. 3 a block diagram of a vaporizer system configured to provide a consistent high power, high voltage output to a heater, consistent with implementations of the current subject matter.

FIG. 3 illustrates a block diagram of a vaporizer system 300 configured to provide a consistent high power, high voltage output to a heater 350, consistent with implementations of the current subject matter. As shown in FIG. 3, the vaporizer system 300 includes a battery 312, a battery management integrated circuit (IC) 314, a synchronous boost converter (SBC) 320, a microcontroller 304, a metal oxide semiconductor field effect transistor (MOSFET) 325, and a heater 350. The battery 312 may include a single cell lithium-ion battery or any other single-cell battery and may include the power source 112 of FIG. 1A. The battery 312 may be coupled to the battery management IC 314 and the SBC 320 and configured to provide a battery voltage (Vbat) to the battery management IC and the SBC 320. The battery management IC 314 may be configured to provide system power to the microcontroller 304 and may be further configured to provide a voltage boost output (e.g., at least a 5V output) to the SBC 320. The battery management IC 314 may also be configured to reduce battery charging time and extend battery life during discharging phase by using a low impedance power path.

As noted above, a vaporizer battery (e.g., battery 112 or 312) may not be capable of providing a sufficient voltage level for an HNB heater. As shown in FIG. 3, the battery 312 may provide the battery voltage (Vbat) to the SBC 320. The SBC 320 may be configured to boost or increase the input voltage and may be configured to produce an output voltage and an output current at a power output sufficient to power the heater 350 and HNB vaporizer device (e.g., 12V/5 A). The output voltage from the SBC 320 may be input into the MOSFET 325 and the microcontroller 304 may provide an on/off control signal to the MOSFET 325 to control when and/or how much power is delivered to the heater 350 (e.g., in response to detecting a puff from a user). When the microcontroller 304 turns on the heater control signal, the MOSFET 325 may provide the output voltage and output current (e.g., 12V/5 A) to the heater 350 for the heater 350 to heat the vaporizable material to a sufficient temperature below combustion levels for an HNB vaporizer heater.

Figure 4:
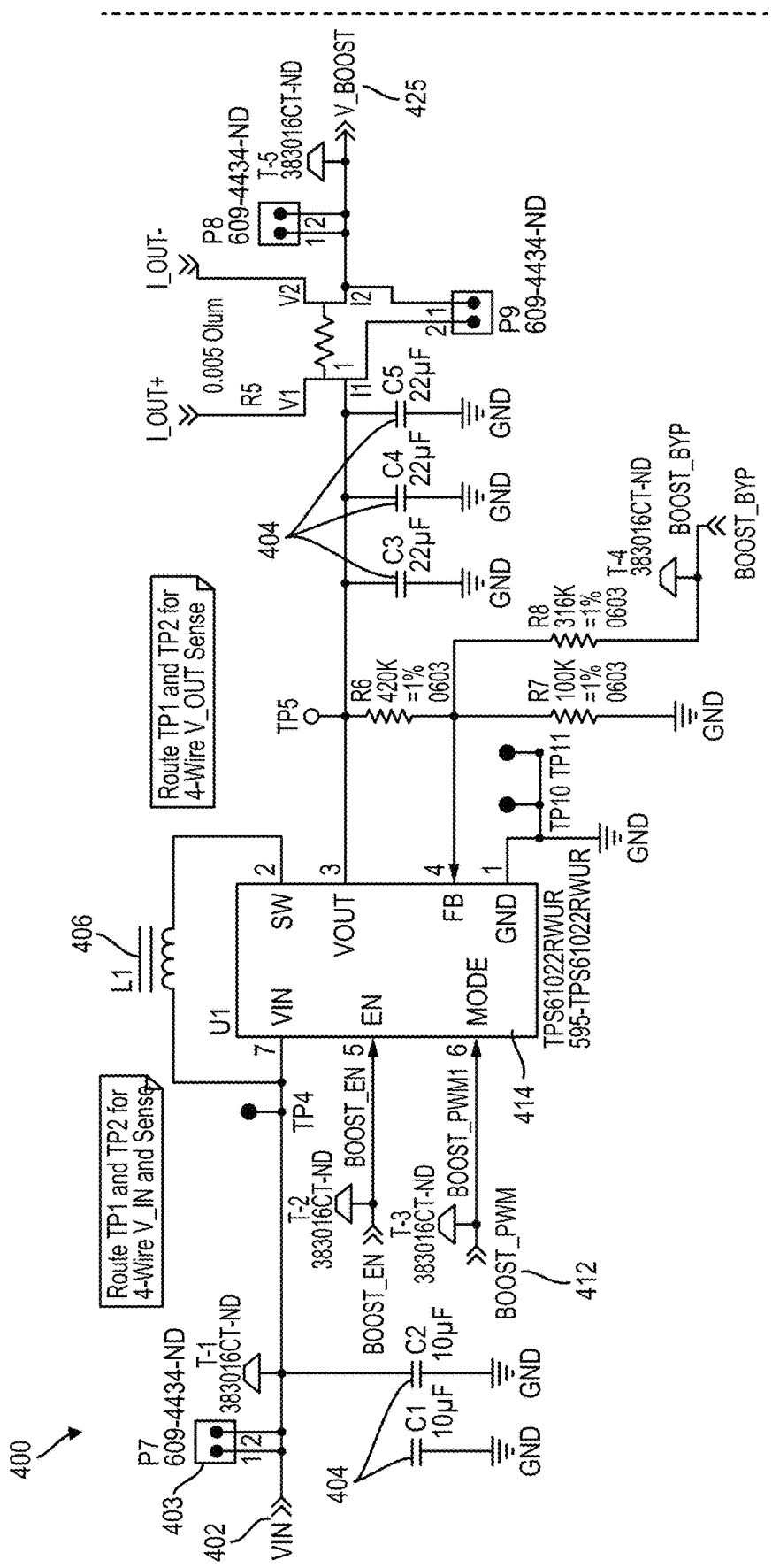
FIG. 4 illustrates an example circuit diagram of a voltage boost circuit of a battery management integrated circuit, consistent with implementations of the current subject matter.

FIG. 4 illustrates an example circuit diagram 400 of a voltage boost circuit of the battery management IC 314, consistent with implementations of the current subject matter. As shown in FIG. 4, the voltage boost circuit includes an input voltage 402, a potentiometer 403, at least one capacitor 404, an inductor 406, an integrated circuit 414, a pulse width modulation (PWM) signal 412, and an output voltage 425 (Vout or V_boost). The voltage boost circuit may be configured to provide the output voltage 425 that is higher than the input voltage 402. In some aspects, the output voltage 425 may be at least 5V higher than the input voltage 402. In some implementations, the at least one capacitor 404 may be configured as a filter to reduce voltage changes and may provide a consistent output voltage. While the voltage boost circuit of FIG. 4 is described herein as internal to the battery management IC 314, the voltage boost circuit may also be external to and separate from the battery management IC 314 (e.g., a first boost converter circuit).

Figure 5:
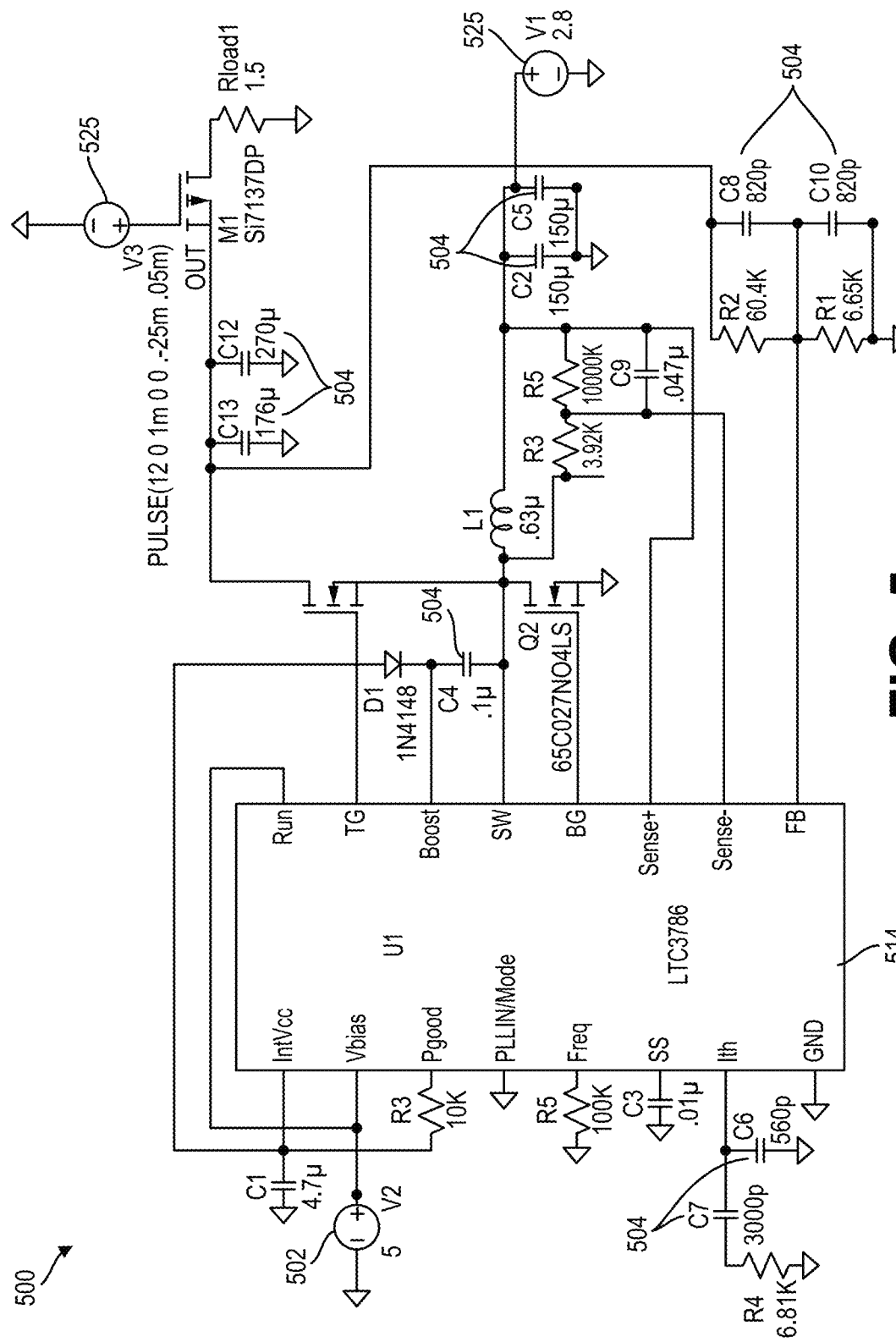
FIG. 5 illustrates an example circuit diagram of a synchronous boost converter (SBC), consistent with implementations of the current subject matter.

FIG. 5 illustrates an example circuit diagram 500 of the SBC 320, consistent with implementations of the current subject matter. As shown in FIG. 5, the SBC 320 includes a bias voltage (Vbias) 502, an integrated circuit 514, at least one capacitor 504, and an output voltage 525. In some aspects, the SBC 320 may include high power switches that may require a voltage bias of at least 5V to operate. In some implementations, the voltage boost circuit of FIG. 4 may provide the output voltage 425 of at least 5 V to the SBC 320 (e.g., via the integrated circuit 514).

In some aspects, the bias voltage 502 includes the output voltage 425 from the battery management IC 314 and may be used to power the integrated circuit 514. The integrated circuit 514 may be configured to operate with an input voltage to the SBC 320 that may range as low as 2.5V and may include a voltage from the battery 312 (Vbat). In some aspects, the integrated circuit 514 may include a synchronous boost converter controller (e.g., LTC3786 by Analog Devices Inc.) that drives an N-channel power MOSFETs and provides synchronous rectification that increases efficiency, reduces power losses, and eases thermal requirements. As noted above, the output voltage 525 may be at a level (e.g., 12 V) sufficient to power the heater 350 for an HNB vaporizer.

Figure 6:
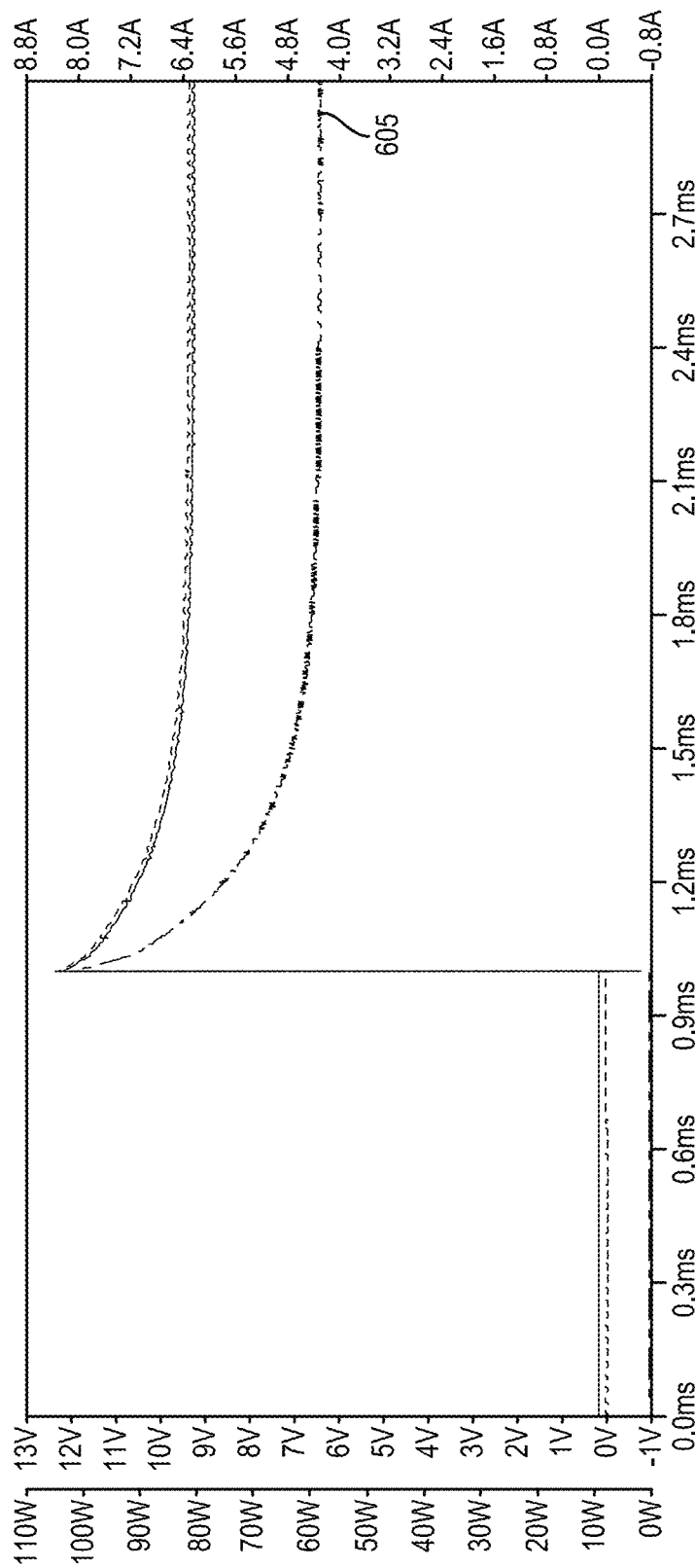
FIG. 6 is a chart of simulation results for driving a heater from a power source, consistent with implementations of the current subject matter.

FIG. 6 is a chart of simulation results for driving a 1.5 Ohm heater from a source of 2.8V, corresponding to a low state of charge battery at 100% duty cycle (maximum battery power output), using a voltage boost circuit. As shown in FIG. 6, the simulation shows a circuit (e.g., the line 605) is able to maintain an approximately 60 W power output over time.

Figure 7:
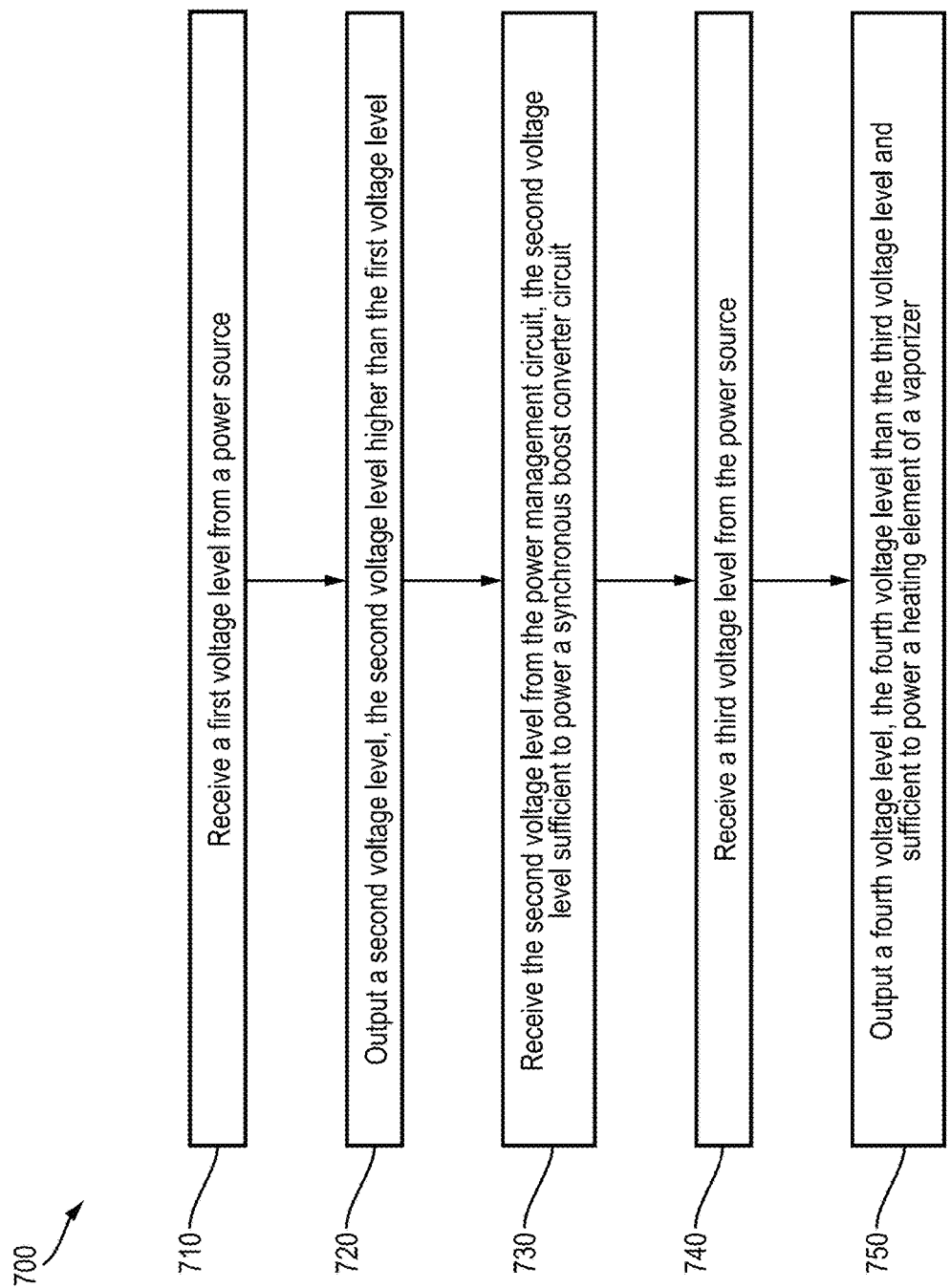
FIG. 7 depicts a flowchart illustrating an example of a process for generating synthetic images, consistent with implementations of the current subject matter.

FIG. 7 depicts a flowchart illustrating an example of a process 700 for boosting power provided to a heat not burn (HNB) heating element, in accordance with some example embodiments. Referring to FIGS. 1-6, the process 700 may be performed by a computing apparatus such as, for example, the battery management circuit 314, the synchronous boost circuit 320, the controller 304, the voltage boost circuit 400, the circuit 500, a controller, the integrated circuit 514, and/or the like.

At operational block 710, the battery management circuit 314 may receive a first voltage level from a power source. For example, the power source may include a battery (e.g., battery 312). Referring to FIG. 3, the first voltage level (e.g., Vbat) may not be sufficient to power a heating element (e.g., heating element 150) of the vaporizer 100.

At operational block 720, the battery management circuit 314 may output a second voltage level, the second voltage level higher than the first voltage level. For example, the second voltage level may be approximately 5 V higher than the first voltage level. The battery management circuit 314 (e.g., a first boost converter circuit) may output the second voltage level via a step up converter circuit.

At operational block 730, the synchronous boost circuit 320 may receive the second voltage level from the power management circuit (e.g., battery management circuit 314), the second voltage level sufficient to power the synchronous boost converter circuit 320 (e.g., a second boost converter circuit). For example, the synchronous boost circuit 320 may be configured to operate in response to receiving at least 2.5 V.

At operational block 740, the synchronous boost circuit 320 may receive a third voltage level from the power source (e.g., battery 312). For example with reference to FIG. 3, the synchronous boost circuit 320 may receive the third voltage level from the battery 312 (e.g., Vbat).

At operational block 750, the synchronous boost circuit 320 may output a fourth voltage level, the fourth voltage level higher than the third voltage level and sufficient to power a heating element of the vaporizer 100. For example, the fourth voltage level may be at least 12 V and sufficient to power a heat not burn (HNB) heating element (e.g., heater 350 and/or heating element 250) of the vaporizer 100. The fourth voltage level (e.g., 12 V) provided by the synchronous boost converter circuit 320 (e.g., a second boost converter circuit) may be higher than the second voltage level (e.g., 5 V) provided by the battery management circuit 314 (e.g., a first boost converter circuit). The fourth voltage level may be provided to the heating element in response to a signal from the controller 304 and/or 104. The signal from the controller 304 may be triggered by the vaporizer 100 detecting a puff from a user on the mouthpiece 130.

Terminology

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present.

Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the teachings herein. For example, the order in which various described method steps are performed may often be changed in alternative embodiments, and in other alternative embodiments, one or more method steps may be skipped altogether. Optional features of various device and system embodiments may be included in some embodiments and not in others. Therefore, the foregoing description is provided primarily for exemplary purposes and should not be interpreted to limit the scope of the claims.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A vaporizer device comprising:
   a vaporizer body comprising:
      a power source configured to supply power to a heating element of a cartridge including a vaporizable material when the cartridge is coupled to the vaporizer body;
      a controller configured to activate a signal to control the supplied power to the heating element;
      a power management circuit coupled to the power source and configured to:
         receive a first voltage level from the power source, and
         output a second voltage level, the second level voltage higher than the first voltage level;
      a synchronous boost converter circuit coupled to the power source and to the power management circuit, the synchronous boost converter circuit configured to:
         receive the second voltage level from the power management circuit, the second voltage level sufficient to power the synchronous boost converter circuit,
         receive a third voltage level from the power source, and
         output, to a transistor, a fourth voltage level, the fourth voltage level higher than the third voltage level and sufficient to power the heating element, the transistor coupled to the heating element and configured to power the heating element in response to the controller activating the signal.

2. The vaporizer device of claim 1, wherein the cartridge includes a vaporization chamber configured to hold the vaporizable material, wherein the heating element is configured to heat the vaporizable material within a threshold temperature range, and wherein the heating of the vaporizable material generates an inhalable aerosol comprising the vaporizable material.

3. The vaporizer device of claim 2, wherein the threshold temperature range is below a combustion level of the vaporizable material.

4. The vaporizer device of claim 1, wherein the vaporizer body further comprises a receptacle configured to releasably couple to the cartridge.

5. The vaporizer device of claim 1, wherein the vaporizer device is a heat not burn (HNB) device.

6. The vaporizer device of claim 1, wherein the second voltage level is at least 5 volts higher than the first voltage level.

7. The vaporizer device of claim 1, wherein the controller is configured to activate the signal in response to a sensor detecting a puff on the cartridge.

8. The vaporizer device of claim 1, wherein the power management circuit is configured to provide power to the controller.

9. The vaporizer device of claim 1, wherein the transistor comprises a metal oxide semiconductor field effect transistor.

10. The vaporizer device of claim 1, wherein the synchronous boost converter circuit comprises an integrated circuit configured to provide synchronous rectification.

11. The vaporizer device of claim 1, wherein the power management circuit comprises a capacitor configured to filter an output voltage to reduce voltage changes and provide a consistent output voltage.

12. A method comprising:
   receiving, at a power management circuit, a first voltage level from a power source;
   outputting, at the power management circuit, a second voltage level, the second level voltage higher than the first voltage level;
   receiving, at a synchronous boost converter circuit, the second voltage level from the power management circuit, the second voltage level sufficient to power the synchronous boost converter circuit;
   receiving, at the synchronous boost converter circuit,-a third voltage level from the power source; and
   outputting, by the synchronous boost converter circuit to a transistor, a fourth voltage level, the fourth voltage level higher than the third voltage level and sufficient to power a heating element of a vaporizer, wherein the fourth voltage level is provided to the heating element.

13. The method of claim 12, wherein the heating element is disposed in a cartridge.

14. The method of claim 13, wherein the cartridge includes a vaporization chamber configured to hold a vaporizable material, wherein the heating element is configured to heat the vaporizable material within a threshold temperature range, and wherein the heating of the vaporizable material generates an inhalable aerosol comprising the vaporizable material.

15. The method of claim 14, wherein the threshold temperature range is below a combustion level of the vaporizable material.

16. The method of claim 12, wherein the vaporizer is a heat not burn (HNB) device.

17. The method of claim 12, wherein the second voltage level is at least 5 volts higher than the first voltage level.

18. The method of claim 12, wherein the transistor is coupled to the heating element and configured to output the fourth voltage level to the heating element.

19. The method of claim 12, further comprising activating, in response to a sensor detecting a puff on the vaporizer, a signal to control a supplied power to the heating element.

20. A vaporizer device comprising:
    a vaporizer body comprising:
        a power source configured to supply power to a heating element of a cartridge including a vaporizable material when the cartridge is coupled to the vaporizer-device body;
        a first boost converter circuit coupled to the power source and configured to:
            receive a first voltage level from the power source, and
            output a second voltage level;
        a second boost converter circuit coupled to the power source and coupled to the first boost converter circuit, the second boost converter circuit configured to:
            receive the second voltage level from the first boost converter circuit, the second voltage level sufficient to power the second boost converter circuit,
            receive a third voltage level from the power source, and
            output, to the heating element, a fourth voltage level, the fourth voltage level higher than the third voltage level and sufficient to power the heating element.

* * * * *